United States Patent
Zhang et al.

(10) Patent No.: US 10,673,839 B2
(45) Date of Patent: Jun. 2, 2020

(54) SYSTEMS AND METHODS FOR AUTHENTICATING NETWORK MESSAGES

(71) Applicant: MASTERCARD INTERNATIONAL INCORPORATED, Purchase, NY (US)

(72) Inventors: Jenny Qian Zhang, Wildwood, MO (US); Justus Albert Srigiri, Marietta, GA (US); Brian Christopher Loeffler, Wright City, MO (US); Ankur Panthi, Lake St. Louis, MO (US); Ronald Marc Phillips, Wentzville, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 15/707,726

(22) Filed: Sep. 18, 2017

(65) Prior Publication Data
US 2018/0007035 A1     Jan. 4, 2018

Related U.S. Application Data

(63) Continuation-in-part of application No. 14/942,048, filed on Nov. 16, 2015, now Pat. No. 9,769,142.

(51) Int. Cl.
*H04L 9/20* (2006.01)
*H04L 29/06* (2006.01)
(Continued)

(52) U.S. Cl.
CPC ........ *H04L 63/0823* (2013.01); *H04L 9/3213* (2013.01); *H04L 9/3268* (2013.01);
(Continued)

(58) Field of Classification Search
None
See application file for complete search history.

(56) References Cited

U.S. PATENT DOCUMENTS 8,533,860 B1 *  9/2013  Grecia ................. H04L 63/083
                                                        726/29
9,215,231 B1 * 12/2015  Bowen ................ H04L 63/1416
(Continued)

FOREIGN PATENT DOCUMENTS

EP         1189407 A2     3/2002

OTHER PUBLICATIONS

Adding SAML to Two_factor Authentication and Single Sign_ON Model for Dynamic Access Control. Fugkeaw et al. IEEE. (Year: 2007).*

(Continued)

*Primary Examiner* — Venkat Perungavoor
(74) *Attorney, Agent, or Firm* — Harness, Dickey & Pierce, P.L.C.

(57) ABSTRACT

Networks and methods for use in authenticating messages are provided. One exemplary method generally includes receiving a message from a client, where the message includes a client certificate. The method also includes validating, by an application programming interface (API) gateway, a computing device based on a certificate identifying the computing device as a recognized computing device, and validating, by the API gateway, the client based on the client certificate via a global access manager, separate from the repository. The method further includes causing a security token indicative of the client to be generated, when the computing device and the client are validated, whereby the security token is indicative of the client and permits the message, from the client, to be delivered to one or more backend services.

9 Claims, 3 Drawing Sheets

(51) Int. Cl.
  *H04L 9/32* (2006.01)
  *H04W 12/06* (2009.01)
  *G06F 21/78* (2013.01)
  *H04L 29/08* (2006.01)

(52) U.S. Cl.
  CPC .......... *H04L 63/0807* (2013.01); *H04L 63/10* (2013.01); *H04W 12/06* (2013.01); *H04L 63/168* (2013.01); *H04L 67/02* (2013.01); *H04L 67/1002* (2013.01); *H04L 2209/38* (2013.01)

(56) References Cited

U.S. PATENT DOCUMENTS

| | | | | |
|---|---|---|---|---|
| 9,462,044 | B1* | 10/2016 | Preibisch | H04L 67/10 |
| 2002/0035685 | A1 | 3/2002 | Ono et al. | |
| 2004/0254848 | A1 | 12/2004 | Golan et al. | |
| 2010/0042844 | A1 | 2/2010 | Zou et al. | |
| 2012/0179587 | A1* | 7/2012 | Hill | G06Q 30/04 |
| | | | | 705/34 |
| 2012/0180021 | A1* | 7/2012 | Byrd | G06F 21/45 |
| | | | | 717/100 |
| 2012/0180022 | A1* | 7/2012 | Hopkins | G06F 8/30 |
| | | | | 717/100 |
| 2014/0047040 | A1* | 2/2014 | Patiejunas | H04L 51/24 |
| | | | | 709/206 |
| 2014/0108262 | A1 | 4/2014 | Plateaux et al. | |
| 2015/0229618 | A1 | 8/2015 | Wan et al. | |
| 2017/0142085 | A1 | 5/2017 | Zhang et al. | |

OTHER PUBLICATIONS

Keeping Your API Keys in a Safe. Lu et al. IEEE. (Year: 2014).*
Towards an Authentication Middleware to Support Ubiquitous Web Access. Zhang et al. IEEE. (Year: 2004).*
Design and Implementation of Cloud API Access Control Based on OAuth. Wu et al. iEEE. (Year: 2013).*
Distributed Authorization in Complex Multi Entity-Driven API Ecosystems. Thatmann. IEEE. (Year: 2014).*
Keystone Federated Security. Sitaraman.ICITST. (Year: 2013).*
A token-based user authentication mechanism for data exchange in RESTful API. Huang et al. IEEE. (Year: 2015).*
An Extensible Design for Service Access Gateway Based on REST Platform. Hongman et al . IEEE. (Year: 2011).*
"Handbook of Applied Cryptography", Meneyes, Vanstone, Oorschot; 1997, 49 pgs.
MICROSEC "PassBy[ME] The Next Generation Authentication Technology", Sep. 8, 2014, 8 pgs.
Thomson "Configuring mutual ssl", Oct. 2, 2015, 10 pgs.
MasterCard "MasterCard SecureCode Merchant Implementation Guide", Jun. 17, 2014, 72 pgs.
U.S. Appl. No. 14/942,048, filed Nov. 16, 2015, Zhang et al.
PCT/US2016/061277: PCT International Search Report and Written Opinion (11 pages), dated Jan. 16, 2017. PCT/US2016/061277 claims priority to U.S. Appl. No. 14/942,048.
U.S. Appl. No. 14/942,048: Notice of Allowance dated May 17, 2017. This instant application is a continuation-in-part of U.S. Appl. No. 14/942,048.

* cited by examiner

SYSTEMS AND METHODS FOR AUTHENTICATING NETWORK MESSAGES

CROSS-REFERENCE TO RELATED APPLICATION

This application is a continuation-in-part application of U.S. patent application Ser. No. 14/942,048, filed Nov. 16, 2015. The entire disclosure of the above application is incorporated herein by reference.

FIELD

The present disclosure generally relates to systems and methods for use in authenticating messages, for example, network messages, including authenticating messages from clients, and further authenticating computing devices through which the messages are passed.

BACKGROUND

This section provides background information related to the present disclosure which is not necessarily prior art.

Payment networks are provided for various different types of messaging to and from clients, such as merchants, acquirers, issuers, and other entities, and further, in certain instances, among the clients. Because the messages generally include sensitive and/or confidential data, or seek access to sensitive and/or confidential data, known payment networks employ a variety of encryption techniques to protect the data, and may further dictate security conditions for messaging to and/or from the payment networks. Also, payment networks are known to employ security hierarchies, whereby as messaging progresses between different network parts or zones within the payment networks, continued authentication of the messages is needed to ensure security of the payment networks.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Payment networks provide a variety of services, which may relate to payment account transactions and/or use of transaction data, that rely on access to the payment networks by one or more other entities (broadly, clients), both internal and external, etc. Access is provided in the form of messages received, by the payment networks, from the clients. As described herein, each of the messages includes a security certificate, which is utilized by a payment network to authenticate the clients. Moreover, the networks (e.g., payment networks, etc.) and methods herein authenticate messages (e.g., application programming interface (API) messages, etc.) at multiple levels. In particular, when a message is received at a payment network from a client, a computing device appends the client certificate to the message as an object, and optionally further appends its own certificate to the message, prior to transmitting the message on to an API gateway. In turn, the API gateway validates the certificate of the computing device (from which the API gateway received the message), based on either a local repository within the API gateway (e.g., by the communication itself or through the certificate appended to the message, etc.) or from a repository apart from the API gateway, and further validates the client certificate, i.e., the appended object, via a global access manager apart from the API gateway. Upon the multi-level authentication (e.g., at the client level and the computing device level, etc.), the API gateway causes a security token to be generated, which is indicative of the client and usable within the payment network to access backend servers and/or services provided thereby. In this manner, security is enhanced to keep transaction data and other data within the payment network protected from unauthorized access.

Figure 1:
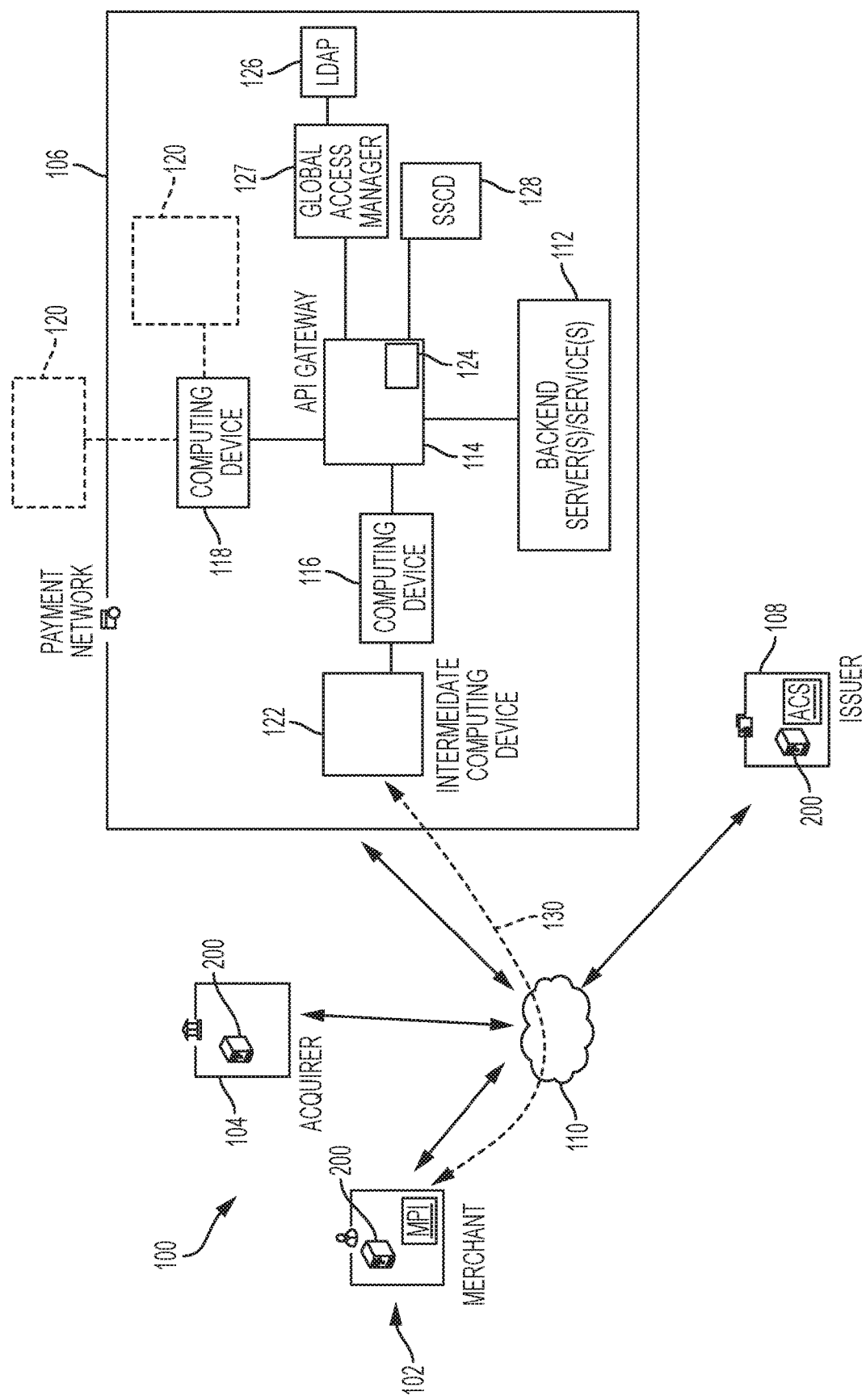
FIG. 1 is a block diagram of an exemplary system of the present disclosure, including a payment network suitable to authenticate messages transmitted to the payment network.

FIG. 1 illustrates an exemplary system 100 in which one or more aspects of the present disclosure may be implemented. Although parts of the system 100 are presented in one arrangement, it should be appreciated that other exemplary embodiments may include the same or different parts arranged otherwise, for example, depending on validation of messaging to the payment network, etc.

As shown in FIG. 1, the illustrated system 100 generally includes a merchant 102, an acquirer 104, a payment network 106, and an issuer 108, each coupled to network 110. The network 110 may include, without limitation, a wired and/or wireless network, a local area network (LAN), a wide area network (WAN) (e.g., the Internet, etc.), a mobile network, and/or another suitable public and/or private network capable of supporting communication among two or more of the illustrated parts of the system 100, or any combination thereof. In one example, the network 110 includes multiple networks, where different ones of the multiple networks are accessible to different ones of the illustrated entities in FIG. 1. In this example, the network 110 may include a private payment transaction network made accessible by the payment network 106 to the acquirer 104 and the issuer 108 and, separately, a network through which the payment network 106 and merchant 102 may communicate (e.g., via a web-based application, etc.).

In general, in FIG. 1, the merchant 102 offers one or various products (e.g., goods and/or services, etc.) for sale to a consumer. In order to purchase products, the consumer presents a payment device (associated with a payment account) to the merchant 102. In turn, the merchant 102, the acquirer 104, the payment network 106, and the issuer 108 cooperate, in response to the consumer, to complete a transaction (broadly, a purchase transaction) for the product using the consumer's payment account. As part of the purchase transaction, the merchant 102 reads the payment device and communicates, via the network 110, an authorization request to the payment network 106, via the acquirer 104 (associated with the merchant 102), to process the transaction (e.g., using the MasterCard® interchange, etc.).

The payment network 106, in turn, communicates the authorization request to the issuer 108 (associated with the consumer's payment account). The issuer 108 then provides an authorization response (e.g., authorizing or declining the request) to the payment network 106, which is provided back (via the payment network 106) through the acquirer 104 to the merchant 102. The transaction with the consumer is then completed, or not, by the merchant 102, depending on the authorization response. If the transaction is completed, the purchase transaction is later cleared and settled by and between the merchant 102 and the acquirer 104 (in accordance with a settlement arrangement, etc.), and by and between the acquirer 104 and the issuer 108 (in accordance with another settlement arrangement, etc.).

The above is a brief description of a transaction to the payment network 106, which is provided for purposes of illustration of the payment network's interactions with other entities. It should be appreciated that multiple messages are directed to the payment network 106 in the above transaction, and further messages may be directed to the payment network 106 as the transaction is subjected to additional services. For example, if the payment account to which the transaction is directed is subject to 3D secure services, one or more additional messages may be directed to the payment network 106 (and specifically a directory backend service therein) to authenticate the consumer, prior to authorizing the transaction.

Further, as part of the transaction above, and multiple transactions like it, transaction data is generated among the merchant 102, the acquirer 104, the payment network 106, the issuer 108, and the consumer. Depending on the transaction, the transaction data may include, without limitation, payment account numbers, merchant IDs, acquirer IDs, terminal IDs, merchant category codes (MCCs) assigned to the merchant 102 (e.g., by the payment network 106, etc.), time stamps, etc. Once generated, the transaction data is stored in one or more different entities of the system 100, and specifically the payment network 106 (e.g., in a data center (not shown) or otherwise).

The transaction data may further provide a basis for a variety of services offered by the payment network 106, through a backend server and/or services 112 offered thereby. Such services may relate to, for example, fraud protection, analytics, marketing insights, rewards, etc. The services may be provided to the entities shown in FIG. 1, or duplicates thereof, or to other parts, such as, for example, third parties that act in cooperation with one or more of the entities of FIG. 1. In the 3D secure example, an authentication entity may include one or more third parties, such as merchant plug-ins (MPIs) (as indicated as included in and/or associated with the merchant 102 in FIG. 1) and/or access control servers (ACSs) (included in and/or associated with the issuer 108). Each is usable in implementing 3D security protocols, to transmit messages to the payment network 106, and to receive messages therefrom, in order to authenticate consumers prior to purchase transactions. It should be appreciated that messages transmitted to the payment network 106, and intended to reach backend servers/services 112 at the payment network 106, may be provided for any different number and/or type of services offered by the payment network 106, to entities shown and not shown in FIG. 1.

As further shown in FIG. 1, the payment network 106 includes one or more of the backend servers 112, which are provided to host one or a variety of backend services offered by the payment network 106. In this particular embodiment, the backend server(s) 112 exposes multiple APIs to external and/or internal clients, through which one or more of the services may be utilized. The APIs may include, for example, one or more of the following exemplary APIs provided by Mastercard International Incorporated: an Assurance IQ API configured to provide assurance that consumers are transacting digitally using genuine attributes; an Automatic Billing Updater (ABU) API configured to reduce card-not-present (CNP) transaction declines caused by changed account numbers and expiration dates; a Bill Payment Validator API configured to determine if an account is eligible for bill payment using, for example, the Remote Payment and Presentment Service (RPPS) system offered by MasterCard®; a BIN Table Resource API; a Fraud Scoring for Merchants API configured to provide a predictive, behavior-based fraud score tool for e-commerce merchants; a Location Services API configured to access a global database of ATM and merchant locations for use in client applications and/or websites; a Lost and Stolen Account List API configured to identify cards that have been reported lost or stolen by issuers; the MasterCard Send™ API configured to send money, domestically and cross border; the Masterpass™ API configured to simplify checkout experiences for consumers using digital wallets; the Masterpass™ QR API; the MasterCard Digital Enablement Service (MDES) API configured to provide services around the tokenization of MasterCard card numbers for increased payment security; a Merchant Identifier API configured to provide information about a given merchant; a MoneySend API configured to move funds between accounts and send disbursements; a Payment Gateway Services (MPGS) API configured to provide global payment processing services and fraud prevention and risk management solutions to merchants and banks; a Repower API configured to add cash to an eligible payment card; a Spend Controls API configured to manage how, when and where a payment account is used; etc. That said, other APIs may be provided from the backend server(s) 112, or other computing devices, in other embodiments.

In general, the APIs, provided by payment network 106, are accessible through API gateway 114 (e.g., an XML gateway (e.g., associated with a Rest API, etc.), an ESB (enterprise service bus) gateway by IBM®, etc.) and two recognized computing devices 116 and 118, which are coupled to the API gateway 114. It should be appreciated, however, that there may be one or more additional computing devices and/or gateway devices included in the payment network 106 in other embodiments, which may be in line between an intermediate computing device 122 and the backend server(s) 112, depending on, for example, various aspects of the different system embodiments (e.g., volume of traffic, geographic distribution of the payment network 106, etc.).

In this exemplary embodiment, the computing devices 116 and 118 are each network routers. And, the computing device 116, in this example, is configured to receive, provide and/or respond to verification messages for the 3D secure protocols (e.g., the SecureCode® service offered by MasterCard®, etc.), from the merchant 102, via the MPI included in and/or associated therewith, and also the ACS included in and/or associated with the issuer 108. In addition, computing device 118 is configured to coordinate messaging to/from IPsec, or other security protocols, virtual private networks (VPNs) and to/from clients (via DMZ computing devices, or perimeter networks, etc.), generally internal or external to the payment network 106, as indicated by the dotted box/line in FIG. 1. Uniquely, the API gateway 114 may include a local repository 124, as shown, which is provided in memory of the API gateway 114. The local repository 124 includes certificate validation data, specific to recognized computing devices 116 and 118 only, whereby the recognized computing devices 116 and 118 may be validated internally at the API gateway 114 without having to access other devices (e.g., a global access manager 127, etc.) (yet other unrecognized computing devices cannot be validated internally at the API gateway 114). In particular, the local repository 124 includes the distinguished name of the client certificates of the computing devices 116 and 118. Conversely, however, the API gateway 114 may alternatively rely on a repository outside of the API gateway 114, such as, for example, a lightweight directory access protocol (LDAP) computing device 126 and/or the global access manager 127.

Further, as shown in FIG. 1, the payment network 106 includes the intermediate computing device 122, between the client and the computing device 116. The intermediate computing device 122 generally includes a router (e.g., an edge router, etc.), which may include, in this example, load balancing and/or application firewall functionality. The computing device 122 may be, in some embodiments, a data center (or IDC) F5 computing device. Also, in this exemplary embodiment, the payment network 106 further includes two additional computing devices. One computing device is the global access manager 127 within the payment network 106, which is configured to interact with the LDAP computing device 126 as the data repository, for validation of internal and external clients. And, the other computing device is a security services computing device (SSCD) 128, which is configured to generate security tokens accepted within the payment network 106, and specifically, by the backend server(s) 112 and services offered thereby.

While each of the above computing devices is illustrated as separate, in this particular embodiment, it should be appreciated that certain of the computing devices may be integrated together, or further separated from each other or from the payment network 106 in general, in other payment network embodiments. Further, other computing devices may be employed, in addition to, or in place of one or more of the computing devices illustrated in FIG. 1. For example, the API gateway 114 is only coupled to two recognized computing devices 116 and 118 to receive client messages. It should be understood that a different number of computing devices may be "recognized" computing devices to the API gateway 114 in other embodiments, depending on, for example, the services offered by the backend server(s) 112, volume of client messaging, a payment network topology, etc. In addition, while "connected" by lines in FIG. 1 to illustrate exemplary message flows, it should be appreciated that the computing devices 116 and 118 and also the intermediate computing device 122 are coupled to a network (e.g., similar to network 110, etc.) within the payment network 106, whereby each is able to communicate, in this embodiment, to one another. In this manner, as described more below, the intermediate computing device 122, for example, is able to pass messages to the computing device 118, for example, to impose load balance operations, etc.

What's more, while the payment network 106 is illustrated as including the particular parts described above (for this embodiment), the system 100 is not limited to such geographic arrangement of the payment network 106 and/or otherwise to one entity and/or group of computing devices. It should be appreciated that the parts of the payment network 106 may include computing devices at a single location, but may also include computing devices distributed across a geographic region. Further still, the computing devices may be provided through one or more cloud-base services, which are utilized by the payment network 106. Regardless of arrangement, though, configuration and/or message processing is substantially consistent with the description herein.

Figure 2:
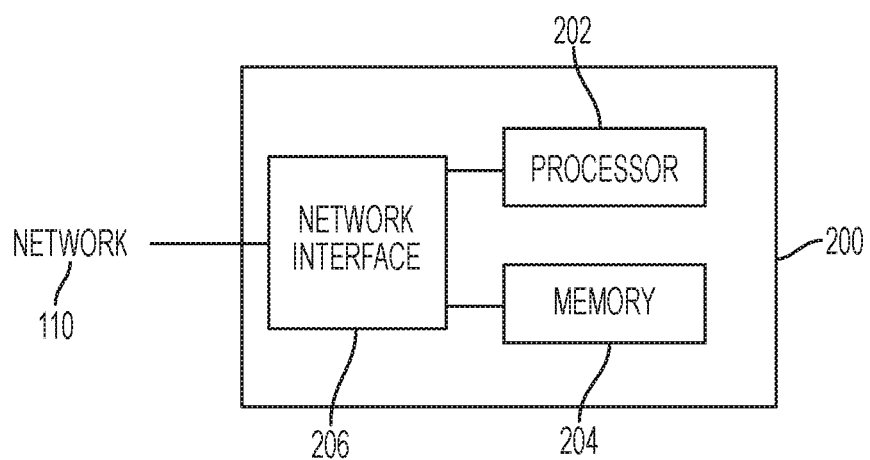
FIG. 2 is a block diagram of a computing device, that may be used in the exemplary payment network illustrated in FIG. 1.

FIG. 2 illustrates exemplary computing device 200, which is suitable for use in the system 100. By way of example (and without limitation), the exemplary computing device 200 may include one or more servers, workstations, computers, routers, gateways, or combinations thereof, etc., as appropriate. In the system 100 (of FIG. 1), the merchant 102, the acquirer 104, and the issuer 108 are each associated with, or implemented in, a computing device 200. Further, the backend server(s) 112, the API gateway 114, and each of the computing devices 116, 118, 120, 122, 126, 127, and 128 may be consistent with the computing device 200. With that said, it should be understood that the system 100 is not limited to the computing device 200, as different computing devices and/or arrangements of computing devices may be used. It should also be understood that different parts and/or arrangements of parts may be used in other computing devices. Furthermore, in various exemplary embodiments, the computing device 200 may include multiple computing devices located in close proximity, or distributed over a geographic region.

With reference to FIG. 2, the illustrated computing device 200 generally includes a processor 202, and a memory 204 that is coupled to the processor 202. The processor 202 may include, without limitation, one or more processing units (e.g., in a multi-core configuration, etc.), including a general purpose central processing unit (CPU), a microcontroller, a reduced instruction set computer (RISC) processor, an application specific integrated circuit (ASIC), a programmable logic circuit (PLC), a gate array, and/or any other circuit or processor capable of the functions described herein. The above examples are exemplary only, and are not intended to limit in any way the definition and/or meaning of processor.

The memory 204, as described herein, is one or more devices that enable information, such as executable instructions and/or other data, to be stored and retrieved. The memory 204 may include one or more computer-readable storage media, such as, without limitation, dynamic random access memory (DRAM), static random access memory (SRAM), read only memory (ROM), erasable programmable read only memory (EPROM), solid state devices, CD-ROMs, tapes, flash drives, hard disks, and/or any other type of volatile or nonvolatile physical or tangible computer-readable media. The memory 204 may be configured to store, without limitation, transaction data, certificates, security technologies, security tokens (e.g., SAML tokens, etc.) and/or any other types of data suitable for use as described herein, etc. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer-readable storage media. It should be appreciated that the memory 204 may include a variety of different and/or separate memories, each implemented in one or more of the functions or processes described herein.

In addition, the illustrated computing device 200 includes a network interface 206 coupled to the processor 202 (and, in some embodiments, to the memory 204 as well). The network interface 206 may include, without limitation, a wired network adapter, a wireless network adapter, a telecommunications adapter, or other device capable of communicating to one or more different networks, including the network 110. In some exemplary embodiments, the computing device 200 includes one or more network interfaces 206 incorporated into or with the processor 202.

Referring again to FIG. 1, the payment network 106, in this embodiment, is configured to perform multiple levels of authentication of messages received from, for example, the merchant MPI, other external clients, and/or internal clients 120 (broadly, clients). In the exemplary embodiment of FIG. 1, messages permitted in the payment network 106 are SSL messages, or mutual SSL (MSSL) messages, or TLS messages or Mutual TLS (MTLS) messages, etc. It should be appreciated that other payment network embodiments, however, may include other, different types of messaging and/or protocols to provide security based on certificates or otherwise, etc.

Upon receipt of a message from the merchant MPI, for example, the intermediate computing device 122 is configured to validate the message, append the client certificate (associated with the client sending the message) to the message as an object (e.g., as a certificate object, etc.), and then transmit the message to the API gateway 114, via the computing device 116, which optionally appends its certificate to the message. Similarly, the computing device 118 is configured to, for internal messages received from clients 120, in this embodiment, to optionally append the client certificate to the message as an object and further append its own certificate to the message. In general, for example, the computing device 118 appends its own certified to the message when it terminates the message, and generates another message to the API gateway 114 (e.g., for a MTLS message, etc.). Conversely, when the computing device 118 does not terminate the message, it will not append its own certificate to the message. In the absence of appending its certificates to the message, the computing devices 116 and 118 and the API gateway 114 are configured to utilize certification provided in connection with the message itself being received to verify the source computing device of the message (e.g., through MTLS, etc.).

What's more, the computing device 116 is configured to unwrap the payload of the message, whereby the message is terminated at the computing device 116, and to generate, based on the payload, a value for the message. The value may be generated in any number of ways and may be based on any aspect of the payload. For example, the value may simply include a remainder of the PAN or a token, when divided by 2 (i.e., 0 or 1). The computing device 116 is then configured to determine a load balancing route for the message, which in the context of FIG. 1, for example, is either the computing device 116 (when the value is 0) or computing device 118 (when the value is 1). When the value is 0, in this example, the computing device 116 is configured to re-wrap the message and transmit it to the API gateway 114. Conversely, when the value is 1, the computing device 116 is configured to re-wrap the message and transmit it to the computing device 118. It should be appreciated that the computing device 118 is similarly configured to provide load balancing for messages received from internal clients 120.

In turn, the API gateway 114 is configured to initially validate the computing device 116/118 based on the local repository 124 therein (or the LDAP 126) when the message is terminated at the computing device 116/118, or based on the intermediate computing device 122 when the message did not terminate at the computing device 116/118. For instance, in communicating therebetween, when transmitting a MTLS message, after terminating the message from the intermediate computing device 122, the computing device 116/118 is configured to pass its certificate to the API gateway 114 (as part of the mutual authentication). The API gateway 114 is configured, in turn, to access validation variables stored on the local repository 124, or in the LDAP 126, which include data, such as authenticated device name (DN), for identifying computing devices which are allowable. The validation variables are compared against data in the certificates (e.g., request.authenticatedDN, etc.) passed from the computing device 116/118 (or, optionally, as appended to messages by computing devices (e.g., computing devices 116 and 118)). If the comparison succeeds, the computing devices are authenticated. In some embodiments, the API gateway 114 may assign the authenticated device name to a context variable (e.g., mc_systemID, mc_authenticatedDN, etc.), which maintains the authenticated status of the computing device throughout the interaction. Conversely, where the message is not terminated at the computing device 116/118, the API gateway 114 is configured to validate the intermediate computing device 122 based on the local repository 124 therein (or the global access manager 127 and/or the LDAP 126). If the authentication fails, the API gateway 114 may handle the failure by stopping the validation process and providing a message explaining why the authentication failed.

Next, the API gateway 114 is configured to open the payload of the message and to validate the client, from which the message was transmitted, by use of the appended object, which is the client certificate. To do so, the API gateway 114 is configured to call the LDAP computing device 126, via the global access manager 127 (i.e., the local repository 124 does not include content to validate each client to the payment network 106). When each is validated, the API gateway 114 is configured to then generate an internal security token, which is converted to a security token accepted by the backend server(s) 112, after which the message (including the security token) is transmitted to the backend server(s) 112, whereby the service, to which the message was directed, is invoked as necessary.

Figure 3:
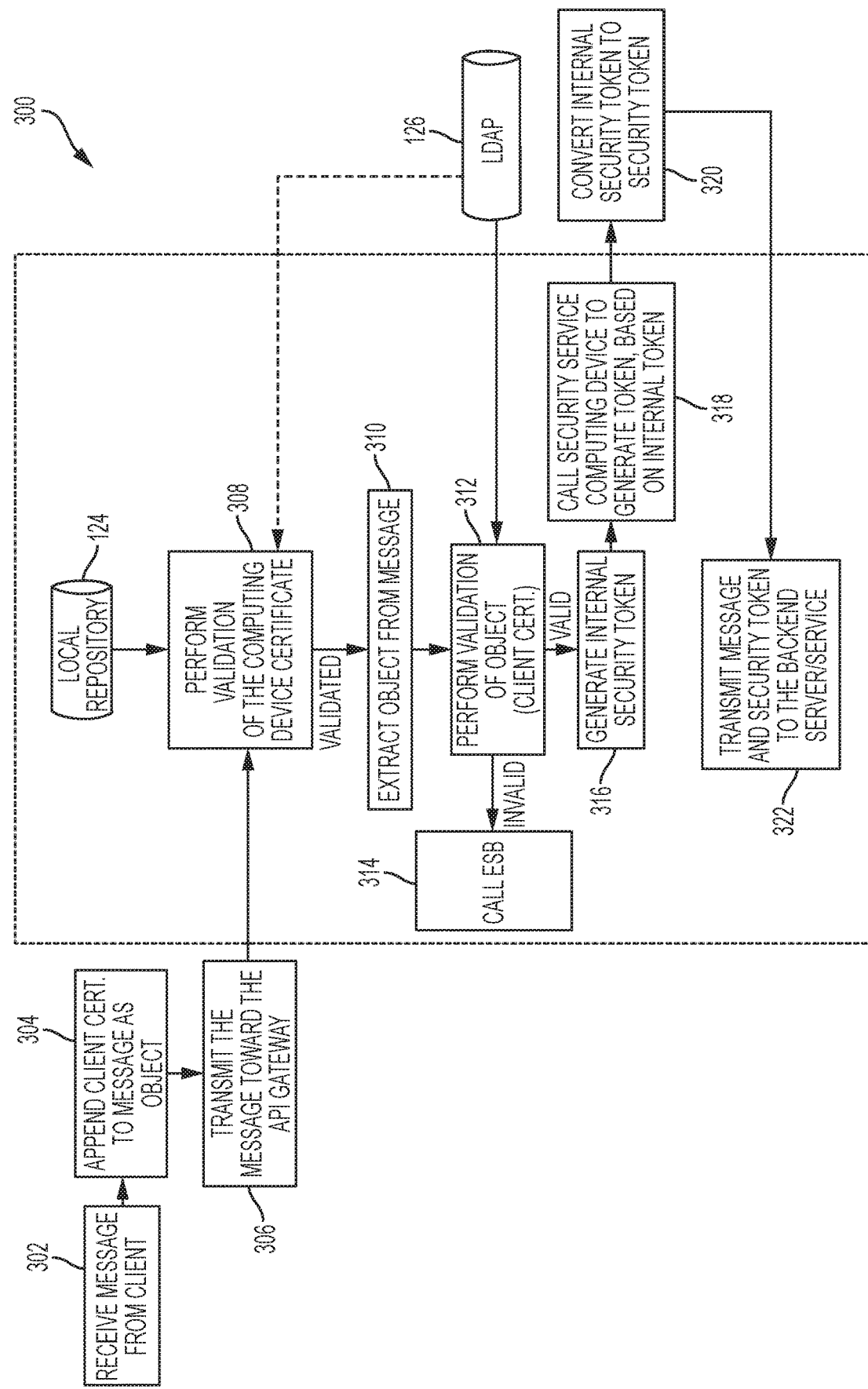
FIG. 3 is an exemplary method, which may be implemented in the payment network illustrated in FIG. 1, for authenticating messaging therein.

FIG. 3 illustrates an exemplary method for use in authenticating messages within the payment network 106, at the client level and further at the computing device level. The exemplary method 300 is described as implemented in the system 100, with further reference to the API gateway 114 and the computing devices 116, 118, and 122 shown in FIG. 1. For example, operations enclosed in the dotted box, in FIG. 3, for example, are included in and/or performed by the API gateway 114, in this exemplary embodiment. The method 300, however, could be implemented in one or more other entities or parts of the system 100 and/or parts of payment network 106, in other embodiments. And, just as the methods herein should not be understood to be limited to the exemplary system 100, or the exemplary computing device 200, the systems and the computing devices herein should not be understood to be limited to the exemplary method 300.

The method 300 is described with reference to a 3D secure message, transmitted by the merchant MPI and received at the intermediate computing device 122, as shown as 130 in FIG. 1. It should be appreciated that a message may be received from one or more other external entities, as shown in FIG. 1, or otherwise, and that the message may be related to any aspect of the payment network 106, but will often be provided to access one or more services offered by the backend server(s) 112, through one or more APIs as described and/or listed above. Further, messages may be received at the computing device 118, for example, from one or more entities internal or external to the payment network 106, as indicated by the dotted blocks 120

(e.g., internal clients, external clients, etc.), to again access one or more services offered by the backend server(s) 112, through one or more APIs.

Referring to FIG. 3, at 302, a message (e.g., a TLS message, etc.) is received at the computing device 122 from the external client, and specifically, in this example, the merchant 102 (and/or acquirer 104), via the MPI. The MPI message, as indicated above, is provided to authenticate a consumer in connection with a payment account transaction, pursuant to a 3D secure protocol, etc. The MPI message is received at the computing device 122, via network 110 (as indicated by 130 in FIG. 1). The network 110, in this example, is a HTTP-type network, such that the message received includes a HTTP message. It should be understood, however, that different types of networks may be employed in other examples, whereby the message may be of a different type or provided according to different protocols. Also, the message received from the client includes a client certificate for the external client, i.e., the merchant MPI, and in particular, a TLS certificate.

Upon receipt of the message, the intermediate computing device 122 validates the client certificate (received as a prelude to enable the messaging being sent from the MPI or other computing device) associated with the given message, alone or in conjunction with one or more other services and/or computing devices within the payment network 106. The validation is based on one or more checks that are either internal to the payment network 106 or external to the payment network 106. For example, the intermediate computing device 122 may be configured to validate the message based on the message being signed by a dedicated certificate authority (CA) (e.g., specific to MPI messaging, etc.) and/or based on a signature or certificate included in the message, whereby the intermediate computing device 122 excludes messages, for example, when not signed by one of multiple known CAs. If the client is validated, the intermediate computing device 122 appends the client certificate (again, received as a prelude to enable the messaging being sent from the MPI or other computing device), at 304, to the message as an object, and specifically, in this embodiment, as an X509 object. The X509 object may be appended to the HTTP header, or elsewhere in the message. In addition, or optionally, the intermediate computing device 122 may append its certificate to the message and transmit, at 306, the message to the API gateway 114, via the computing device 116. Alternatively, rather than appending the intermediate certificate to the message, the certificate of the intermediate computing device 122 may instead be provided, by the intermediate computing device 122, to initiate communication with subsequent computing devices (e.g., the computing device 116, etc.). The certificate is then generally available in the transport layer security (TLS) associated with the message.

The computing device 116, for this message when received, validates the client certificate appended to the message and otherwise acts as a pass-thru when the computing device 116 is non-terminating. When the message is terminated at the computing device 116, for example, for further validation and/or load balancing, the computing device 116 additionally unwraps and re-wraps the payload, whereby the computing device 116 compiles and initiates a message (including the header from the received message (including the X509 object or client certificate)) to the API gateway 114, whereby the computing device's certificate is include in the MTLS message to the API gateway 114 (for use in mutual authentication). In addition to (or as an alternative to) routing the message to the API gateway 114, the computing device 116 may route the message to the computing device 118. Specifically, for example, when the computing device 116 unwraps the payload of the message, the computing device 116 may determine, based on load balancing or other routing rules, to route the message to the computing device 118 rather than the API gateway 114 (as discussed above in the system 100). It should be appreciated that, beyond load balancing, the computing device 116 may perform one or more additional operations related to further validating and/or verifying the message, or filtering the message received from the computing device 122, prior to passing it along to the API gateway 114.

It should be appreciated that when multiple computing devices are intermediate between the intermediate computing device 122 and/or the computing device 116 and the API gateway 114, each computing device may perform various load balancing, validation, etc. operations for the message, whereby the message may be unwrapped, modified, and re-wrapped, etc. In one embodiment, for example, a certificate associated with each intermediate computing device may be appended to the payload of the message. In a different embodiment, only the client certificate may be appended to the message (e.g., as the X509 object, or otherwise, etc.) (thereby permitting other computing devices to rely on the certificate associated with the secure communication). In still a further embodiment, certain computing devices may append their certificates to the payload of the message, while others may not.

Then in the method 300, the API gateway 114 receives the message, and at 308, validates the certificate from the computing device 116 or the intermediate computing device 122 (when the message was not terminated at the computing device 116). In particular, the API gateway 114 extracts the certificate of the computing device 116 or the intermediate computing device 122 from the TLS associated with receipt of the message (i.e., the TLS message) and then relies on certificate validation data in its local repository 124 (or the global access manager 127 and/or the LDAP 126, as indicated by the dotted line in FIG. 3) to validate the certificate, thereby confirming it is a recognized computing device with which the API gateway 114 is permitted to communicate (certificate based). The validation may include merely comparing the distinguished name included in the certificate to a listing of recognized distinguished names in the local repository 124 (or the global access manager 127 and/or the LDAP 126). More often, the API gateway 114 performs a full validation of the message (received via TLS channel) by performing a handshake between the computing device 116 or the intermediate computing device 122 and the API gateway 114 to validate the Certificate Authority trust chain from the computing device 116. Once the handshake is successful, the message reaches the gateway 114, as described above. The API gateway 114 compares the Distinguished Name (DN) of the client certificate from the incoming message, representing the computing device 116, with a list, stored in local repository 124 (or LDAP 126), of predefined DN values for all computing devices that the API gateway 114 has previously authorized. If a match is found, the matched message is successfully validated. In this manner, validation of the message as to the certificate for the computing device 116 is performed locally to the API gateway 114, without requiring communicating with a separate certificate authority, such as, for example, the global access manager 127 which makes use of the LDAP computing device 126.

If the validation reveals the message did not come from a recognized computing device, the API gateway 114 terminates the message, and/or initiates one or more security reviews of the message, etc.

Conversely, if the message is validated to the computing device 116, the API gateway 114 extracts the object, and specifically, in this example, the X509 object, from the message, at 310. Then, at 312, the API gateway 114 performs validation of the object (i.e., the client certificate) for the client providing the message, that is, the merchant MPI in this example. The validation of the client certificate, as shown in FIG. 3, in this exemplary embodiment, requires the API gateway 114 to access the data repository of the global access manager 127 (e.g., the LDAP database 126, etc.), in which credentials for clients are stored (e.g., in memory 204, etc.). Based on this access, the API gateway 114 then performs, at 312, the validation of the certificate according to known techniques.

In most cases, if the message is invalid or not validated, the message will be rejected. However, in this exemplary embodiment, if the message is invalid or not validated because the client or merchant MPI 102 is unknown, the API gateway 114 calls a backend service in the backend server(s) 112 to provision a new client, which includes the enterprise service bus (ESB), at 314. Generally, when the certificate or the merchant MPI 102 is unknown or new to the payment network 106, the API gateway 114 calls to the backend service, which, in turn, registers the client, or merchant MPI. The registration of the merchant MPI is then provided, from the backend server(s) 112, to the global access manager 127, thereby creating the client identifier for the merchant MPI. The client identifier is then provided to the API gateway 114, which in turn, generates the token for the message as described below.

Conversely, if the message is validated, the API gateway 114 causes a security token to be generated for the message and/or the client. In particular, the API gateway 114 generates an internal security token, at 316. The internal security token, in this example, includes a SAML (security assertion markup language) token, which is specific to the client. The API gateway 114 then calls the SSCD 128, at 318. In responses, as shown in FIG. 3, the SSCD 128 converts, at 320, the internal security token into the security token which may be recognized by other parts of the payment network 106, including the backend servers(s) 112 and services provided thereby. After the conversion, the security token, which is also a SAML token in this example, is reverted to the API gateway 114 and is then transmitted to the backend server(s) 112 along with the message, at 322. In response, the backend server(s) 112, and/or a provider of transaction data, or other services, is permitted to facilitate additional messages, as required by the particular service requested. In this exemplary embodiment, in response to the MPI message, the directory service in the backend server 112 verifies the enrollment status of the payment account, whereby the 3D secure protocol, for the transaction, may be continued.

Apart from the intermediate computing device 122 and the computing device 116, messages may originate from a variety of other sources, including internal clients 120, as noted above. In such instances, the message is received at computing device 118 (as described with reference to step 304), which operates to append the client certificate to the message as an object (e.g., an X509 object, etc.) (and further append its own certificate to the message), and pass the message along to the API gateway 114, as described above. The API gateway 114 then performs consistent with steps 308-318 and 322 for the message.

In the manner described above, the API gateway 114 provides a dual level of authentication of the message, at the client level and further at the computing device level (relying on a local repository) to ensure the message is received from a recognized computing device. Thus, messages, which are received as API messages from internal or external clients, are validated at two levels prior to permitting the message to pass through to backend servers and/or backend services, within the payment network 106. The security of messages to the payment network 106, and specifically API messages, in various exemplary embodiments, is subject to enhanced security, whereby the confidential and/or sensitive information included in messages to, from and/or through the payment network 106 are further protected from unauthorized accesses. What's more, the load balancing described herein (e.g., based on a content of the message payload, rather than a token and/or cookie associated with the message, etc.) may be used to ensure and/or promote the handling of messages by consistent computing devices thereby contributing to a reduction in latency issues and/or an improved response to relay attacks.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of: (a) receiving an API message from a client, the API message including a client certificate; (b) appending, by a computing device, the client certificate to the API message as an object; (c) transmitting, by the computing device, the appended API message to an API gateway, the API gateway associated with a plurality of recognized computing devices; (d) validating, by the API gateway, the computing device based on a certificate identifying the computing device as one of the recognized computing devices; (e) validating, by the API gateway, the client based on the client certificate appended to the API message; and (f) causing a security token indicative of the client to be generated, when the computing device and the client are validated, whereby the security token is indicative of the client and permits the API message, from the client, to be delivered to one or more backend services.

With that said, exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," "coupled to," "associated with," or "included with" another element or layer, it may be directly on, engaged, connected or coupled to, or associated with the other element or layer, or intervening elements or layers may be present. As used herein, the term "and/or" includes any and all combinations of one or more of the associated listed items.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in providing authentication of an application programming interface (API) message to a network, the method comprising:
    receiving, by at least one computing device, an API message from a client, the API message including a client certificate, the at least one computing device coupled between the client and an API gateway, the API message directed to one or more backend services each exposing one or more APIs to the client;
    appending, by the at least one computing device, the client certificate to the API message as an object;
    transmitting, by the at least one computing device, the appended API message to the API gateway, the API gateway associated with a plurality of recognized computing devices;
    validating, by the API gateway, for the appended API message, the at least one computing device based on a certificate identifying the at least one computing device as one of the recognized computing devices;
    validating, by the API gateway, for the appended API message, the client based on the client certificate appended to the API message; and
    causing a security token indicative of the client to be generated for the appended API message, when the at least one computing device and the client are validated, whereby the security token is indicative of the client and permits the API message, from the client, to be delivered to the one or more backend services.

2. The method of claim 1, wherein validating the at least one computing device includes validating a distinguished name of the certificate identifying the at least one computing device as consistent with the one of the recognized computing devices.

3. The method of claim 1, wherein causing the security token to be generated includes:
    generating an internal security token, when the at least one computing device is validated and the client is validated;
    causing a security service computing device to convert the internal security token into said security token; and
    transmitting the API message including said security token to the one or more backend services indicated by said API message.

4. The method of claim 3, wherein at least one of the internal security token and said security token includes a security assertion markup language (SAML) token.

5. The method of claim 1, further comprising validating, by the at least one computing device, the client based on the client certificate, via a global access manager, prior to appending the client certificate to the API message as the object.

6. The method of claim 1, wherein the object includes an X509 object; and
    wherein appending the client certificate to the API message includes appending the X509 object to a header of the API message.

7. The method of claim 1, wherein the API message includes an HTTP request; and
    wherein appending the client certificate to the API message includes appending the client certificate, as an X509 object, to a header of the HTTP request.

8. The method of claim 1, wherein the client includes a merchant plug-in (MPI) associated with a 3D secure protocol; and
    wherein the API message includes an authentication request.

9. The method of claim 1, further comprising terminating the API message when the at least one computing device is not validated.

* * * * *